(12) United States Patent
Stojkovic

(10) Patent No.: US 7,886,455 B1
(45) Date of Patent: Feb. 15, 2011

(54) ANGLE JIG AND ASSOCIATED METHOD

(76) Inventor: Stephanie E. Stojkovic, 2050 Cherry Ave., Hanover Park, IL (US) 60133

( * ) Notice: Subject to any disclaimer, the term of this patent is extended or adjusted under 35 U.S.C. 154(b) by 0 days.

(21) Appl. No.: 12/618,414

(22) Filed: Nov. 13, 2009

Related U.S. Application Data

(60) Provisional application No. 61/199,173, filed on Nov. 13, 2008.

(51) Int. Cl.
   *B25H 7/02* (2006.01)
   *G01B 3/56* (2006.01)
(52) U.S. Cl. .......................................... 33/567; 33/534
(58) Field of Classification Search .................. 33/534, 33/537, 567, 573
   See application file for complete search history.

(56) References Cited

U.S. PATENT DOCUMENTS

| | | | |
|---|---|---|---|
| 2,345,312 A | 3/1944 | Sorensen | |
| 2,536,629 A * | 1/1951 | De Sousa | 33/567 |
| 2,822,618 A | 2/1958 | Wendel | |
| 3,722,360 A * | 3/1973 | Blakey et al. | 33/613 |
| 3,846,917 A * | 11/1974 | Blakey | 33/567 |
| 4,490,921 A | 1/1985 | Woods et al. | |
| 4,773,165 A | 9/1988 | Kozyrski | |
| 5,509,214 A * | 4/1996 | Hudimac | 33/642 |
| 5,560,408 A * | 10/1996 | DiFranco | 144/144.1 |
| 5,983,512 A * | 11/1999 | Trapet | 33/567 |
| 7,421,798 B2 * | 9/2008 | Pattee | 33/534 |
| 2009/0320308 A1 * | 12/2009 | Marcum | 33/534 |

* cited by examiner

*Primary Examiner*—G. Bradley Bennett

(57) ABSTRACT

An angle jig for positioning a work article accurately on a machining bed of a milling machine may include a block having a linear array of apertures positioned along a top surface of the block and located parallel to a first longitudinal edge of the block. The block may further include a plurality of curvilinear arrays of apertures positioned along the top surface thereof and located adjacent to a second longitudinal edge of the block. A plurality of dowel pins may be removably interfitted within selected ones of the linear array of apertures as well as selected ones of the curvilinear arrays of apertures. The linear array of apertures may further be used as a guide and cooperates with the curvilinear arrays of apertures to define an angle between 1° and 45° along the top surface of the block.

15 Claims, 4 Drawing Sheets

| Hole# | xdim | ydim | degree | Hole# | xdim | ydim | degree |
|---|---|---|---|---|---|---|---|
| 1 | .5 | −.125 | | | | | |
| 2 | 0 | 0 | | 28 | −3.1555 | 1.6225 | 22 |
| 3 | −.0261 | 1.4997 | 1 | 29 | −3.2814 | 1.841 | 23 |
| 4 | −.061 | 1.7489 | 2 | 30 | −3.4151 | 2.0558 | 24 |
| 5 | −.1046 | 1.9972 | 3 | 31 | −3.5565 | 2.2657 | 25 |
| 6 | −.1569 | 2.2445 | 4 | 32 | −3.125 | 0 | |
| 7 | −.2178 | 2.4904 | 5 | 33 | −3.7825 | 1.3481 | 26 |
| 8 | −.625 | 0 | | 34 | −3.9194 | 1.5592 | 27 |
| 9 | −.7817 | 1.4917 | 6 | 35 | −4.0639 | 1.7658 | 28 |
| | | | | 36 | −4.2158 | 1.9678 | 29 |
| 10 | −.8382 | 1.7369 | 7 | 37 | −4.375 | 2.165 | 30 |
| 11 | −.9033 | 1.9805 | 8 | 38 | −3.75 | 0 | |
| 12 | −.9769 | 2.222 | 9 | 39 | −4.5225 | 1.2857 | 31 |
| 13 | −1.0591 | 2.4620 | 10 | 40 | −4.6773 | 1.2875 | 32 |
| 14 | −1.25 | 0 | | 41 | −4.8392 | 1.6773 | 33 |
| 15 | −1.5362 | 1.4724 | 11 | 42 | −5.0081 | 1.8653 | 34 |
| 16 | −1.6138 | 1.7117 | 12 | 43 | −5.1839 | 2.0478 | 35 |
| 17 | −2.6998 | 1.9487 | 13 | 44 | −4.375 | 0 | |
| 18 | −1.7943 | 2.1831 | 14 | 45 | −5.2566 | 1.2135 | 36 |
| 19 | −1.892 | 2.4148 | 15 | 46 | −5.4281 | 1.3976 | 37 |
| | | | | 47 | −5.6063 | 1.576 | 38 |
| 20 | −1.875 | 0 | | 48 | −5.7909 | 1.77485 | 39 |
| 21 | −2.2884 | 1.4418 | 16 | 49 | −5.9819 | 1.9151 | 40 |
| 22 | −2.3866 | 1.6735 | 17 | 50 | −5.00 | 0 | |
| 23 | −2.493 | 1.9021 | 18 | 51 | −5.984 | 1.132 | 41 |
| 24 | −2.6075 | 2.1274 | 19 | 52 | −6.1709 | 1.3005 | 42 |
| 25 | −2.73 | 2.3492 | 20 | 53 | −6.3639 | 1.4627 | 43 |
| 26 | −2.5 | 0 | | 54 | −6.5629 | 1.6185 | 44 |
| 27 | −3.0375 | 1.4003 | 21 | 55 | −6.7677 | 1.7677 | 45 |

FIG. 5

ANGLE JIG AND ASSOCIATED METHOD

CROSS REFERENCE TO RELATED APPLICATIONS

This application claims the benefit of U.S. Provisional Application No. 61/199,173, filed Nov. 13, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relate to milling machine tools and, more particularly, to an angle jig for providing users with an easy and convenient means of positioning a work article accurately on a machining bed of a milling machine.

2. Prior Art

Machinists are among the most highly skilled industrial workers. Machinists use tools such as lathes, drill presses, and milling machines to produce precision metal parts. They use their knowledge of the working properties of metals and their skill with machine tools to plan and carry out the operations needed to make machined products that meet precise specifications. Increasingly, the machine tools used to produce metal parts are computer numerically controlled (CNC)—that is, they contain computer controllers that direct the machine's operations. The controller "reads" a program—a coded list of the steps necessary to perform a specific machining job—and runs the machine tool's mechanisms through the steps. The introduction of CNC machine tools has changed the nature of the work of machinists. These machines enable machinists to be more productive and to produce parts with a level of precision that is not possible with traditional machining techniques. Although CNC has automated many operations, numerous tasks must still be accomplished manually with the use of specialized equipment and jigs.

Accordingly, a need remains for an angle jig in order to overcome the above-noted shortcomings. The present invention satisfies such a need by providing a device that is convenient and easy to use, is durable yet lightweight in design, is versatile in its applications, and provides an angle jig for positioning a work article accurately on a machining bed of a milling machine.

BRIEF SUMMARY OF THE INVENTION

In view of the foregoing background, it is therefore an object of the present invention to provide an apparatus for accurately positioning a work article on a machining bed of a milling machine. These and other objects, features, and advantages of the invention are provided by an angle jig.

The angle jig for positioning a work article accurately on a machining bed of a milling machine may include a block having a linear array of apertures positioned along a top surface of the block and located parallel to a first longitudinal edge of the block. The block may further include a plurality of curvilinear arrays of apertures positioned along the top surface and located adjacent to a second longitudinal edge of the block. A plurality of dowel pins may be removably interfitted within selected ones of the linear array of apertures as well as selected ones of the curvilinear arrays of apertures. The linear array of apertures may further be used as a guide and cooperates with the curvilinear arrays of apertures to define an angle between 1° and 45° along the top surface of the block. Such an arrangement provides the unexpected and unpredictable advantage of quickly and easily positioning a work article on the apparatus to be machined on a milling machine without having to re-set the work piece with a different sets of milling jigs and fixture.

In one embodiment, each of the curvilinear arrays of apertures may be configured into a plurality of separate groups extending along mutually exclusive paths along the top surface. Each group may further include five apertures spaced apart along a non-linear path such that each aperture in each of the curvilinear array group is spaced apart by one degree from each other respectively. In this way, each of the curvilinear array group may span five degrees such that all of the curvilinear array groups span a total of 45 degrees. The linear array of apertures may further include a total of nine apertures registered along an x-axis defined parallel to the first longitudinal edge of the block and may further be equidistantly spaced apart from each other along the x-axis. Such an arrangement provides the unexpected and unpredictable advantage of accurately positioning a work article using the plurality of pre-fixed angles thus eliminating the need to reposition and adjust the angular measurements to be machined on the work piece.

The invention may further include a method for positioning a work article on a machining bed of a milling machine. Such a method preferably include the chronological steps of: providing a block having a linear array of apertures positioned along a top surface of the block and located parallel to a first longitudinal edge of said block, providing the block further with a plurality of curvilinear arrays of apertures positioned along the top surface and located adjacent to a second longitudinal edge of the block; providing and removably interfitting a plurality of dowel pins within selected ones of the linear array of apertures as well as selected ones of the curvilinear arrays of apertures; and providing and defining an angle between 1° and 45° along the top surface of the block by using the linear array of apertures as a guide to cooperate with the curvilinear arrays of apertures.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 5 is a table showing the x-y dimensions of each aperture in relation to an origin of the x-y axes.

Figure 1:
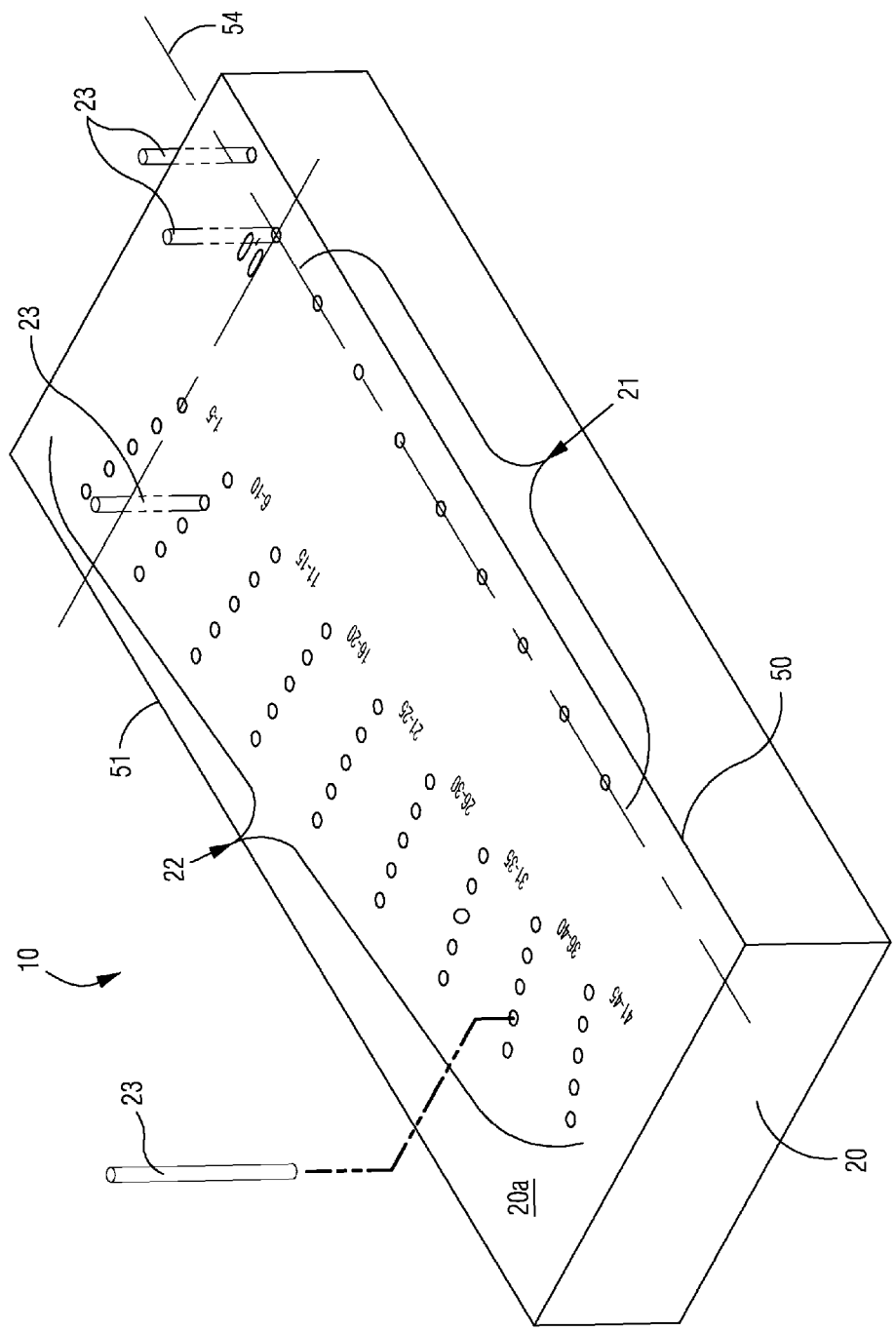
FIG. 1 is a perspective view showing an angle jig, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-5 by the reference numeral 10 and is intended to provide an angle jig. It should be understood that the angle jig 10 may be used to position a work article accurately on a machining bed of a milling machine (not shown) to accurately mill an angle varying from 1 to 45 degrees.

Referring generally to FIGS. 1-5, the angle jig 10 may include a block 20 having a linear array of apertures 21 positioned along a top surface 20a of the block 20 and located parallel to a first longitudinal edge 50 of the block 20. The block 20 may further include a plurality of curvilinear arrays of apertures 22 positioned along the top surface 20a and located adjacent to a second longitudinal edge 51 of the block 20. A plurality of dowel pins 23 may be removably interfitted within selected ones of the linear array of apertures 21 as well as selected ones of the curvilinear arrays of apertures 22. The linear array of apertures 21 may further be used as a guide and cooperates with the curvilinear arrays of apertures 22 to define an angle between 1° and 45° along the top surface 20a of the block 20. Such an arrangement provides the unexpected and unpredictable advantage of quickly and easily positioning a work article at a desired cutting angle on the apparatus 10 to be machined on a milling machine without having to re-set the work piece with a different sets of milling jigs and fixture.

Figure 2:
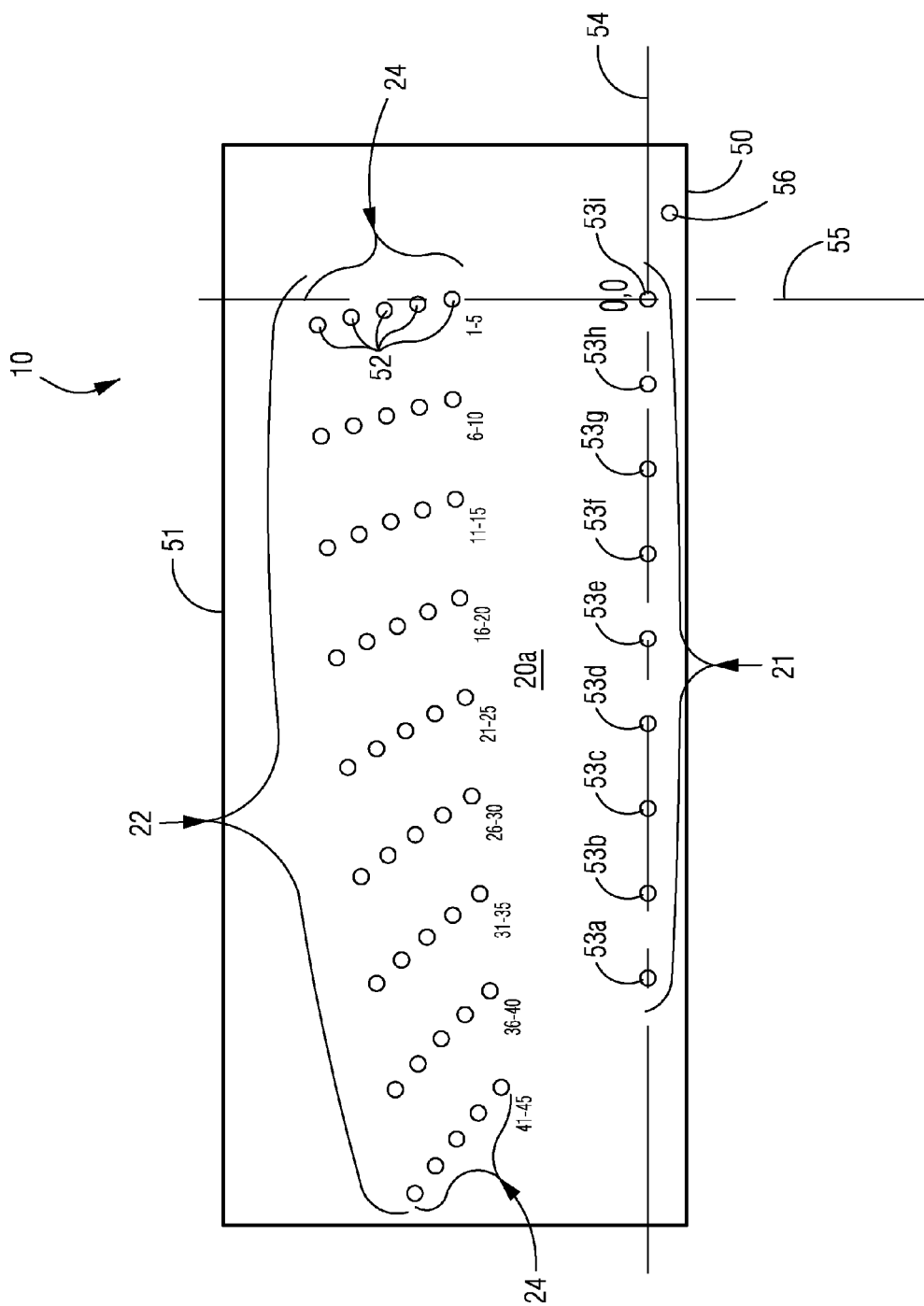
FIG. 2 is a top plan view of the apparatus shown in FIG. 1.
Figure 3:
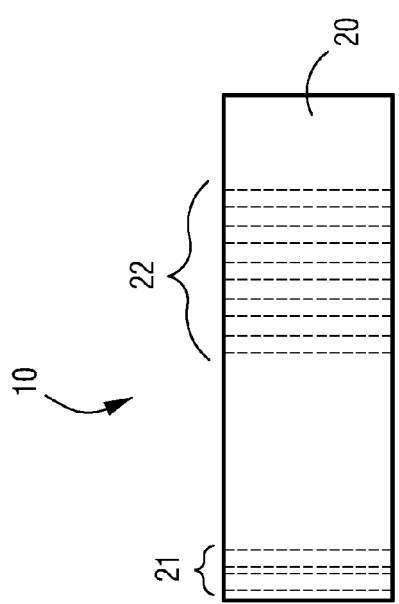
FIG. 3 is a rear elevational view of the apparatus shown in FIG. 1.
Figure 4:
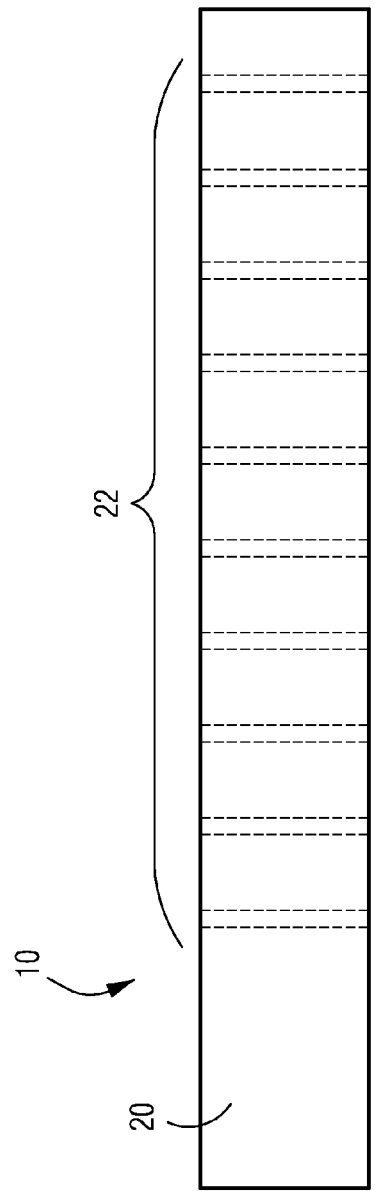
FIG. 4 is a right side elevation view of the apparatus shown in FIG. 1.

Referring to FIG. 2, each of the curvilinear arrays of apertures 21 may be configured into a separate group 24 extending along mutually exclusive paths along the top surface 20a of block 20. Each group 24 preferably includes five apertures 52 spaced apart along a non-linear path such that each aperture 52 in each curvilinear array aperture group 24 is spaced apart from each other by one degree, respectively. In this way, each curvilinear array aperture group 24 preferably spans five degrees such that all of the curvilinear array aperture groups 24 span a total of 45 degrees.

Referring to FIGS. 1 and 2, the linear array of apertures 21 may include a total of nine apertures 53a-53i registered along an x-axis 54 defined parallel to the first longitudinal edge 54 of block 20 and may further be equidistantly spaced apart from each other along the x-axis 54. The "x" and "y" coordinates of each aperture 52, 53a-53i is identified in FIG. 5. The y-axis 55 intersects the x-axis 54 at aperture 53i. It is noted that aperture 53i is designated as the origin of the "x" and "y" coordinates and thereby has the coordinates "0,0". As an option, aperture 56 may be provided to guide and stabilize the work article between 1 and 45 degrees. Such an arrangement of aperture coordinates provides the unexpected and unpredictable advantage of accurately positioning a work article at a desired angle and thus eliminates the need to reposition and adjust an identical angular measurement of successive work articles on the milling bed of the milling machine.

The invention may further include a method for positioning a work article on a machining bed of a milling machine. Such a method preferably include the chronological steps of: providing a block 20 having a linear array of apertures 21 positioned along a top surface 20a of the block 20 and located parallel to a first longitudinal edge 50 of block 20 wherein such block 20 has a plurality of curvilinear arrays of apertures 22 positioned along the top surface 20a thereof and located adjacent to a second longitudinal edge 51 of block 20.

The method may further include the chronological steps of: providing and removably interfitting a plurality of dowel pins 23 within selected ones of the linear array of apertures 21 as well as selected ones of the curvilinear arrays of apertures 22; and defining an angle between 1° and 45° along the top surface 20a of block 20 by using the linear array of apertures 21 as a guide to cooperate with the curvilinear arrays of apertures 22.

The combination of such claimed elements provides an unpredictable and unexpected result which is not rendered obvious by one skilled in the art. The combination of linear and curvilinear arrays of apertures 21, 22 advantageously facilitates the task of measuring milling angles from 1° to 45° and thereby eliminates the need to repeatedly measure the same milling degree for each work article.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An angle jig for positioning a work article accurately on a machining bed of a milling machine, said angle jig comprising:

a block having a linear array of apertures positioned along a top surface of said block and located parallel to a first longitudinal edge of said block, said block further having a plurality of curvilinear arrays of apertures positioned along said top surface and located adjacent to a second longitudinal edge of said block;

a plurality of pins removably interfitted within selected ones of said linear array of apertures as well as selected ones of said curvilinear arrays of apertures;

wherein said linear array of apertures is used as a guide and cooperates with said curvilinear arrays of apertures to define an angle between 1 and 45 degrees along said top surface of said block.

2. The angle jig of claim 1, wherein each said curvilinear array of apertures is configured into a separate group extending along a mutually exclusive path along said top surface of said block.

3. The angle jig of claim 2, wherein each said curvilinear array aperture group comprises:

five apertures spaced apart along a non-linear path;

wherein each said aperture in each said curvilinear array aperture group is spaced apart from each other by one degree respectively.

4. The angle jig of claim 3, wherein each said curvilinear array aperture group spans five degrees such that all of said curvilinear array aperture groups span a total of 45 degrees.

5. The angle jig of claim 1, wherein said linear array of apertures has a total of nine apertures.

6. The angle jig of claim 1, wherein said linear array of apertures is registered along an x-axis defined parallel to said first longitudinal edge of said block.

7. The angle jig of claim 6, wherein said linear array of apertures are equidistantly spaced apart from each other along said x-axis.

8. An angle jig for positioning a work article accurately on a machining bed of a milling machine, said angle jig comprising:

a block having a linear array of apertures positioned along a top surface of said block and located parallel to a first longitudinal edge of said block, said block further having a plurality of curvilinear arrays of apertures positioned along said top surface and located adjacent to a second longitudinal edge of said block;

a plurality of pins removably interfitted within selected ones of said linear array of apertures as well as selected ones of said curvilinear arrays of apertures;

wherein said linear array of apertures is used as a guide and cooperates with said curvilinear arrays of apertures to define an angle between 1 and 45 degrees along said top surface of said block.

9. The angle jig of claim 8, wherein each said curvilinear array of apertures is configured into a separate group extending along a mutually exclusive path along said top surface of said block.

10. The angle jig of claim 9, wherein each said curvilinear array aperture group comprises:

five apertures spaced apart along a non-linear path;

wherein each said aperture in each said curvilinear array aperture group is spaced apart from each other by one degree respectively.

11. The angle jig of claim 10, wherein each said curvilinear array aperture group spans five degrees such that all of said curvilinear array aperture groups span a total of 45 degrees.

12. The angle jig of claim 8, wherein said linear array of apertures has a total of nine apertures.

13. The angle jig of claim 8, wherein said linear array of apertures is registered along an x-axis defined parallel to said first longitudinal edge of said block.

14. The angle jig of claim 13, wherein said linear array of apertures are equidistantly spaced apart from each other along said x-axis.

15. A method of utilizing an angle jig to be positioned on a machining bed of a milling machine, said method comprising chronological steps of:

providing a block having a linear array of apertures positioned along a top surface of said block and located parallel to a first longitudinal edge of said block, said block further having a plurality of curvilinear arrays of apertures positioned along said top surface and located adjacent to a second longitudinal edge of said block;

providing and removably interfitting a plurality of dowel pins within selected ones of said linear array of apertures as well as selected ones of said curvilinear arrays of apertures; and defining an angle between 1 and 45 degrees along said top surface of said block by using said linear array of apertures as a guide to cooperate with said curvilinear arrays of apertures.

* * * * *